(12) United States Patent
Rodrigues De Oliveira

(10) Patent No.: US 9,028,334 B2
(45) Date of Patent: May 12, 2015

(54) METHOD FOR MANUFACTURING A BOLTING PART, TOOL FOR IMPLEMENTING THE METHOD, AND DEVICE FOR TIGHTENING AND LOOSENING SUCH A BOLTING PART

(75) Inventor: Carlos Rodrigues De Oliveira, Charlesvilles-Mezières (FR)

(73) Assignee: Rdo Alpha, Vireux Molhain (FR)

( * ) Notice: Subject to any disclaimer, the term of this patent is extended or adjusted under 35 U.S.C. 154(b) by 722 days.

(21) Appl. No.: 13/121,774

(22) PCT Filed: Oct. 23, 2009

(86) PCT No.: PCT/FR2009/052041
§ 371 (c)(1),
(2), (4) Date: Mar. 30, 2011

(87) PCT Pub. No.: WO2010/046611
PCT Pub. Date: Apr. 29, 2010

(65) Prior Publication Data
US 2011/0183766 A1    Jul. 28, 2011

(30) Foreign Application Priority Data
Oct. 24, 2008 (FR) ...................................... 08 05908

(51) Int. Cl.
*B21K 1/46* (2006.01)
*B25B 13/04* (2006.01)
*B25B 13/06* (2006.01)
*B25B 13/08* (2006.01)
*F16B 23/00* (2006.01)

(52) U.S. Cl.
CPC . *B21K 1/46* (2013.01); *B21K 1/463* (2013.01); *B25B 13/04* (2013.01); *B25B 13/065* (2013.01); *B25B 13/08* (2013.01); *F16B 23/003* (2013.01); *F16B 23/0061* (2013.01); *F16B 23/0076* (2013.01)

(58) Field of Classification Search
CPC ............... F16B 23/007; F16B 23/0061; F16B 23/0076; F16B 35/06; F16B 23/003; B21K 1/44; B21K 1/46; B21K 1/56; B21K 1/463
USPC .................. 470/8, 9, 10, 11, 12, 18, 63, 183; 411/402, 910, 911
See application file for complete search history.

(56) References Cited

U.S. PATENT DOCUMENTS

| 1,658,658 A | | 2/1928 | Schaffer |
| 1,803,803 A | * | 5/1931 | Kaufman ........................ 470/11 |
| 2,226,491 A | * | 12/1940 | Gustafson ..................... 411/186 |

(Continued)

FOREIGN PATENT DOCUMENTS

AT    180798 B    1/1955

*Primary Examiner* — Teresa M Ekiert
(74) *Attorney, Agent, or Firm* — Egbert Law Offices, PLLC

(57) ABSTRACT

A method for manufacturing a bolting part, such as a screw or a nut. The bolting part having a head with a periphery having at least one shoulder extending in a radial plane. The method includes at least the following forming steps: shearing of a wire of material so as to obtain a part of determined length, calibration of the part so as to correct the geometry of the part, rough machining of the calibrated part so as to obtain the head of the bolting part, and finishing of the rough-machined part by means of a third punch so as to form a head having at least one shoulder. The calibration, rough machining and finishing steps being carried out only by cold heading.

8 Claims, 4 Drawing Sheets

(56) References Cited

U.S. PATENT DOCUMENTS

| | | | | |
|---|---|---|---|---|
| 2,287,214 A | * | 6/1942 | Wilcox | 470/11 |
| 2,600,214 A | | 6/1952 | Davis | |
| 2,799,027 A | * | 7/1957 | Hatebur | 470/12 |
| 3,584,667 A | * | 6/1971 | Reiland | 411/402 |
| 3,673,912 A | * | 7/1972 | Herr | 411/403 |
| 4,812,095 A | * | 3/1989 | Piacenti et al. | 411/188 |
| 7,237,462 B1 | * | 7/2007 | Liau | 81/177.1 |
| 8,485,013 B2 | * | 7/2013 | Hossler et al. | 470/11 |

* cited by examiner

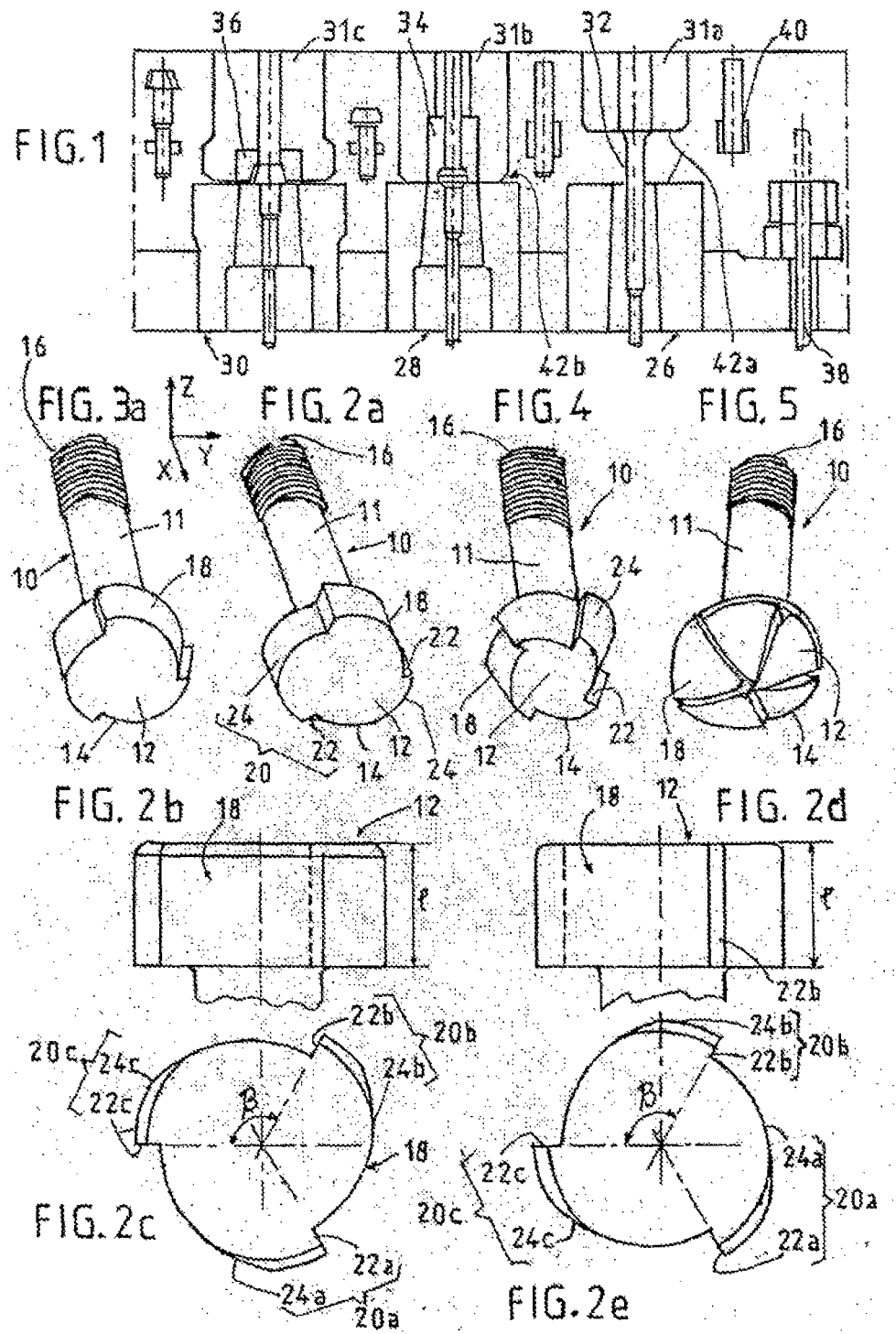

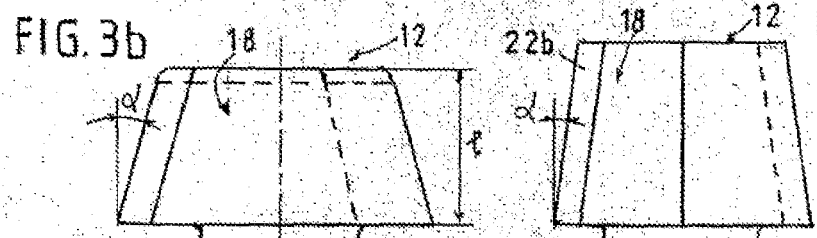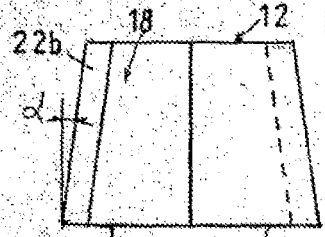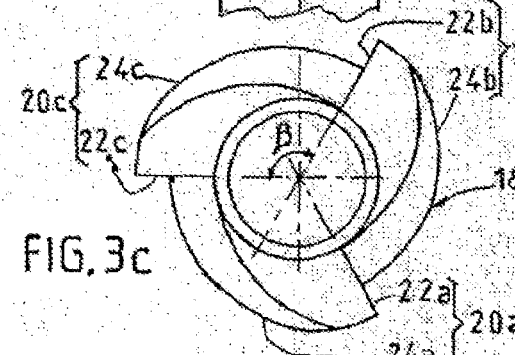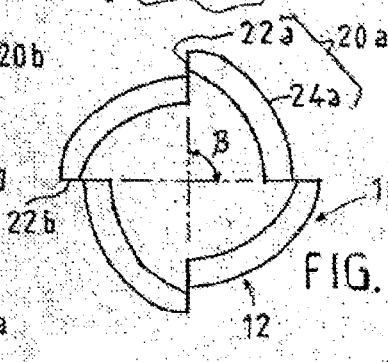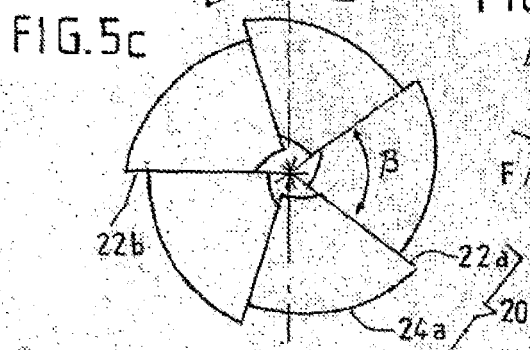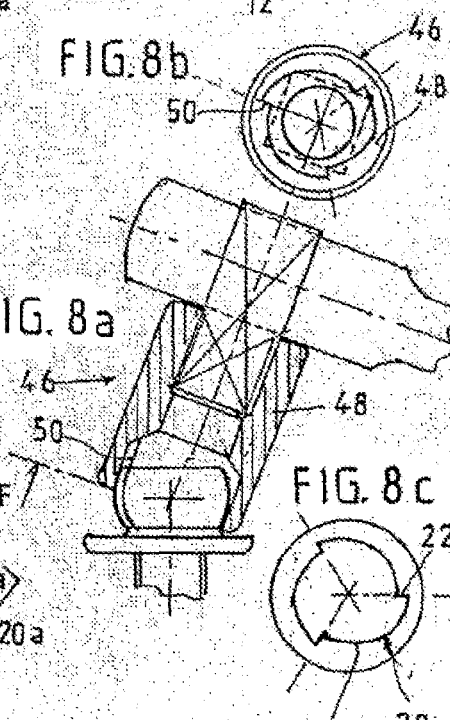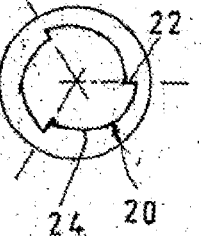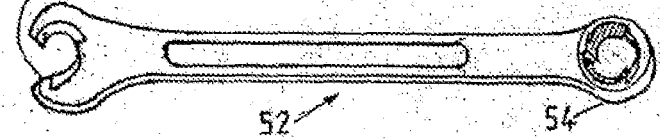

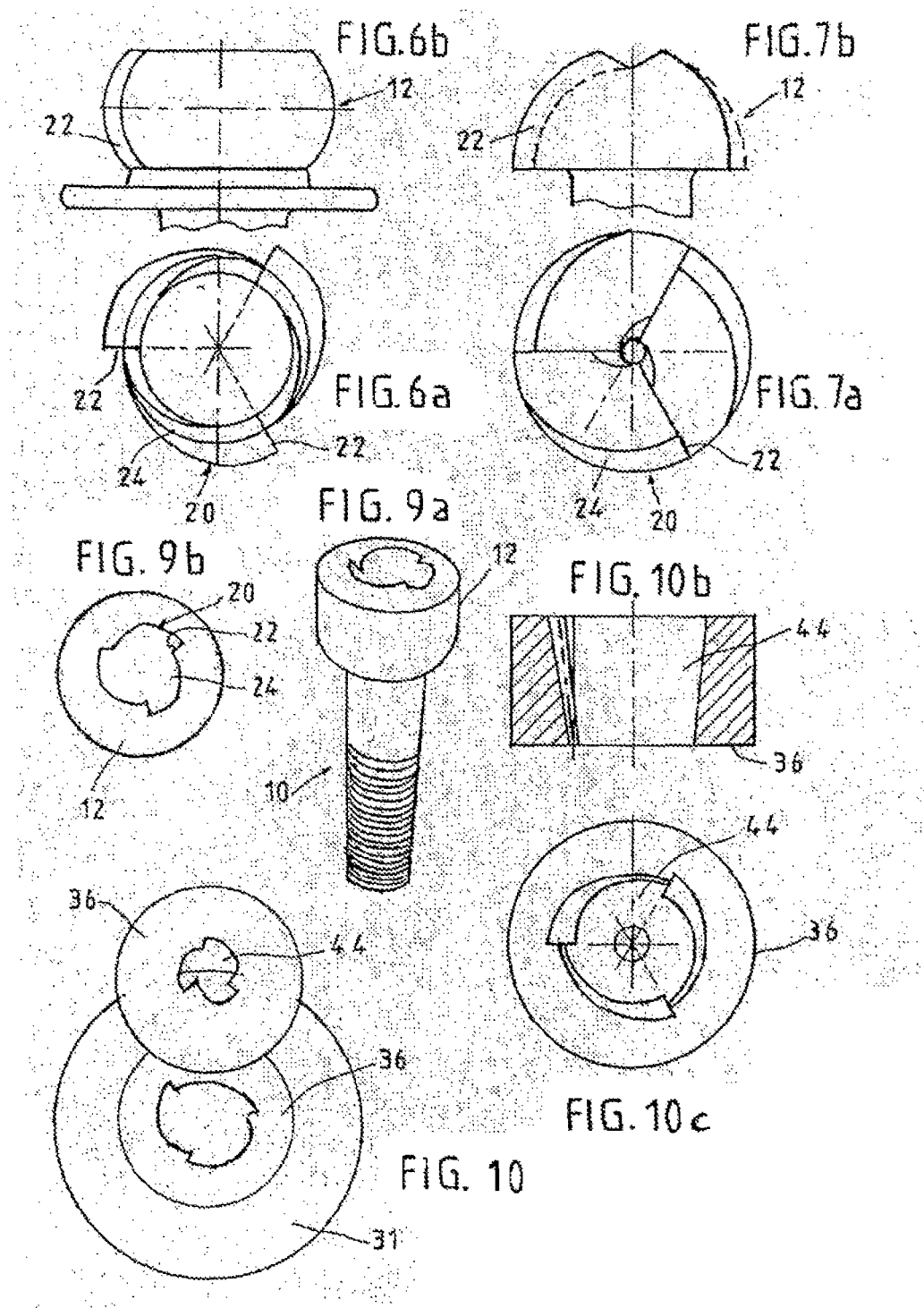

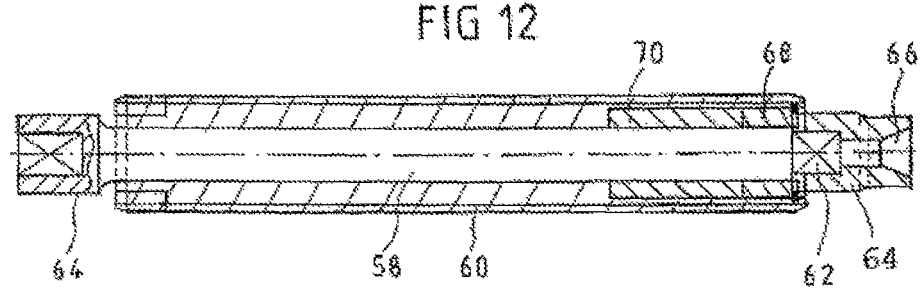
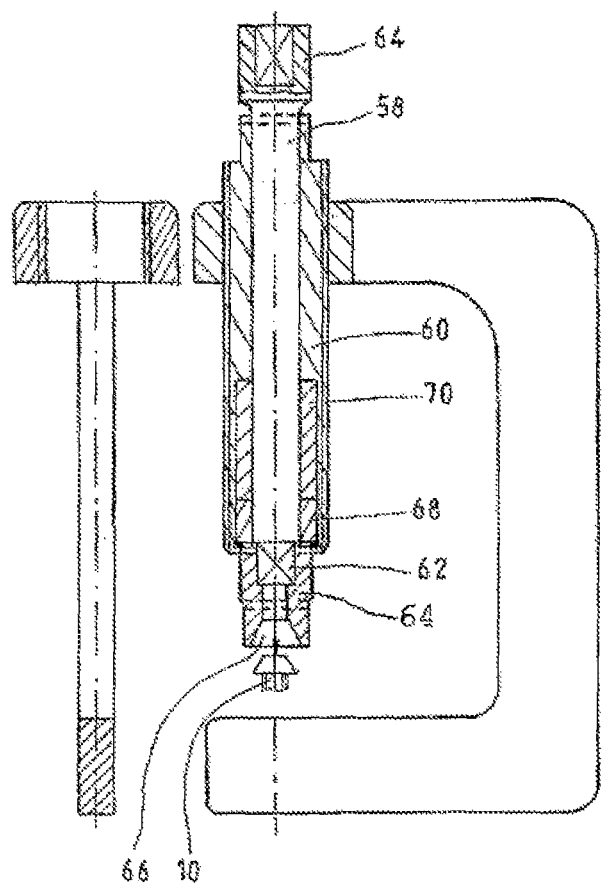

METHOD FOR MANUFACTURING A BOLTING PART, TOOL FOR IMPLEMENTING THE METHOD, AND DEVICE FOR TIGHTENING AND LOOSENING SUCH A BOLTING PART

The present invention relates to a method for manufacturing a screw.

More particularly, it relates to a method for manufacturing a bolting part, such as a screw or a nut, comprising a head extending longitudinally between two ends, the head having in section in a plane perpendicular to the longitudinal direction a substantially circular shape, the head comprising a periphery comprising at least one shoulder extending in a radial plane.

It is known practice from the prior art to make screws by cutting. However, this method causes a wastage of material that is ejected during the formation of the screw in the tool.

It is known practice from document GB 1913 113555 to make screws by hot forging. More particularly, this document describes a screw head which is made so as to allow the screw to be screwed in a first direction, but to prevent the screw from being unscrewed. Accordingly, the screw comprises a head that comprises shoulders and that has a conical shape.

However, the manufacture of screws by hot forging is time-consuming and costly and no longer satisfies the current requirements of industries using screws of this type.

The object of the present invention is to alleviate these drawbacks and to propose a method for manufacturing screws that are tamper-proof or can be removed with special tools, the method providing increased manufacturing rates without wastage of raw material forming the screw, while providing a precision of manufacture that is compatible with accepted tolerance limits.

Accordingly, the manufacturing method as described above is characterized in that it comprises at least the following forming steps: shearing of a wire of material so as to obtain a part of determined length, calibration of the part so as to correct the geometry of the part, that is to say to obtain end faces that are parallel with one another and perpendicular to the body, rough machining of the calibrated part so as to obtain the head of the bolting part, and finishing of the rough-machined part by means of a third punch so as to form at least one shoulder on the head of the bolting part, the calibration, rough machining and finishing steps being carried out only by cold heading.

By virtue of the manufacturing method by cold heading, the material is deformed in order to obtain the final shape without wastage of material, and the manufacturing rates are improved over those of the prior art.

According to other features
  prior to each forming step, the bolting part is placed respectively in a first, a second and a third die and in that it is cold headed, during each forming step, by means respectively of a first, of a second and of a third punch.

The invention also relates to a tool for applying the method described above, wherein:
  the first, the second and the third dies are placed respectively one after the other on a cold heading wire;
  the second punch has a cavity adapted to form a conical head;
  the second punch is adapted to form a head comprising a periphery of convex shape;
  the angle formed between the head and the longitudinal direction is between 0 and 45°;
  the third punch is adapted to form n shoulders extending in radial planes, n being between 1 and 12, each shoulder forming with the consecutive shoulder an angle β such that β=360/n.

The present invention will be better understood on reading the following detailed description made on the basis of the appended drawings in which:

FIG. 1 represents an overview of the toolage wire according to the invention,

FIG. 2a represents a screw comprising three shoulders,

FIGS. 2b and 2c represent respectively a side view and a view from below of the screw represented in FIG. 2a, FIGS. 2d and 2e are views similar to those of FIGS. 2b and 2c, the shoulders being oriented in the opposite direction, FIGS. 3a, 3b and 3c represent respectively a view in perspective, a side view and a view from above of a screw of which the head has a conical shape and comprises three shoulders, FIGS. 4, 4b and 4c represent views similar to FIGS. 3a, 3b and 3c of a screw of which the head has a conical shape and comprises four shoulders, FIGS. 5, 5b and 5c represent views similar to FIGS. 3a, 3b and 3c of a screw of which the head has a conical shape and comprises five shoulders, FIGS. 6a, 6b, 7a and 7b represent a screw of which the head has respectively a spherical shape and a convex shape, FIGS. 8a, 8b represent respectively a view in section and a view from below of a screwing/unscrewing device associated with a bolting part according to the invention, illustrated in a view from below in FIG. 8c, FIGS. 9a and 9b represent a screw with a hollow head comprising a female cavity, FIG. 10 is a view from below of a punch and of a punch insert according to the invention;

FIGS. 10b and 10c represent a view in section and a view from below of a punch according to the invention, FIG. 11 illustrates a screwing and unscrewing device according to a variant of the invention, FIGS. 12 and 13 illustrate a screwing and unscrewing device according to a variant of the invention.

In the various figures, the identical reference numbers correspond to identical or similar elements.

FIGS. 2 to 5 illustrate screws 10 having a head 12 comprising special means making it possible to prevent or make difficult the unscrewing of these screws.

Each screw 10 comprises a body 11 and a head 12 and extends longitudinally between a first end 14 on the side of the head 12 of the screw and a second end 16 opposite to the first. The screw heads 12 have, in a plane perpendicular to the longitudinal direction X, a substantially circular shape. Each screw head 12 has an external periphery 18 on which at least one shoulder 20 is made.

Each shoulder 20 has a bearing face 22 and a convex portion 24. The bearing face 22 extends in a radial plane and is preferably placed over the whole width 1 of the periphery 18.

As can be seen in FIGS. 2a, 2b and 2c, the screw head 12 comprises three shoulders 20a, 20b, 20c oriented to the right, placed in the counterclockwise direction. The bearing faces 22, on which a screwing/unscrewing device can come to bear, allow an easy screwing of the screw 10, in the clockwise direction, and an unscrewing in the counterclockwise direction.

FIGS. 2d and 2e illustrate a screw head 12 for which the shoulders 20 are oriented to the left, that is to say in the clockwise direction.

As illustrated in FIGS. 3, 4 and 5, the screw heads 12 comprise respectively 3, 4 and 5 shoulders 20. The number n of shoulders 20 made on the screw head is chosen according to the requirements of the user. However, on screws of standard size, the number n of shoulders 20 will not be greater than 12. Each shoulder forms with the consecutive shoulder an angle β such that β=360/n.

In FIGS. 3, 4 and 5, the screw head 12 has a conical shape the vertex of which is placed on the side of the first end 14. The angle α formed between the longitudinal direction and the straight line passing through the inclined periphery is such that α is between 0 and 45°.

Unscrewing is possible for the heads having an angle α of between 0 and 7.30°.

When α is greater than or equal to 8°, the convex portion 24 of the shoulders 20 causes a difficult or even impossible unscrewing with a standard tool, because the convex shape makes it practically impossible to gain purchase on the screw head 12 in a tool in order to unscrew it.

In FIG. 3, α=7.30°, in FIG. 4, α=15° and in FIG. 5, α=45°. The larger the angle α, the more difficult it is to unscrew the screw with standard tools.

The combination of the shoulders 20 and the conical shape therefore confers a double guarantee of preventing the unscrewing of the screw. The value α will therefore be determined depending on the needs of the user.

FIG. 1 represents schematically a production line for a screw described above. The production line consists of three dies 26, 28, 30 interacting respectively with three punches 32, 34, 36 placed respectively in a punch insert 31a, 31b and 31c. The screw is obtained from a wire of material 38 that is cold headed between the dies 26, 28, 30 and the corresponding three punches 32, 34, 36, according to the following steps.

The wire is first placed in a first die 26 by means of transfer pliers 40. Then the first punch comes into contact with the first die 26 in order to calibrate the slug or piece of wire 38, that is to say give it the solid cylindrical shape. Then the calibrated part obtained is placed in a second die 28 by means of transfer pliers. The second punch 34 comes into contact with the second die 28 by means of an automatic press 42a for the step of rough machining the screw. By virtue of this step, the head 12 of the screw is formed without wastage of material. The head 12 of the screw may have a cylindrical shape or a conical shape as described above. The second punch 34 will be chosen depending on the desired shape of the head 12.

In order to obtain the shoulders 20, the rough-machined part obtained is placed in a third die 30 associated with a third punch 36 by means of the automatic press 42b.

The third punch 36 is illustrated in FIG. 10. It comprises an opening 44 representing the cavity making it possible to obtain the final screw head 12 with one or more shoulders 20.

Depending on the dimensions of the head of the bolting part, the number of dies and of punches may vary.

Each of these three steps is carried out by cold heading, that is to say by forging of the materials at ambient temperature. This method is particularly advantageous because it allows high manufacturing rates and there is hardly any wastage of material, and therefore not much scrap. Moreover, unlike hot heading, cold heading does not require an additional step cutting the fibers, that is to say a trimming operation, when there is surplus material, in order to obtain the final product.

Moreover, this method makes it possible to obtain greater precision when manufacturing parts and thus to reduce manufacturing tolerances.

Accordingly, the tools making it possible to apply the method, and notably the punches 32, 34, 36 and the dies 26, 28, 30, are made by electrical discharge machining, which provides great precision of the dimensions of the screw obtained after heading.

Moreover, the parts obtained have an improved strength over those manufactured using the methods of the prior art, because the fibers of the material are not deformed.

According to other variant embodiments, the screw head 12 has a convex shape as can be seen in FIGS. 6 and 7. The convex shape can be a portion of a spherical or elliptical shape. In FIGS. 6a and 6b, the head 12 has the shape of a swivel joint formed by a portion of a sphere. This type of shape is of value for hard-to-reach corners, for example when the alignment of the screw stem necessary for standard screwing and standard unscrewing is placed in an environment that is cluttered and difficult to reach; for example, a motor vehicle gearbox or any concentrated mechanical assembly preventing access or a direct view of the screw head. During cold heading manufacture, the punches used are retractable in order to obtain negative spherical shapes.

In FIGS. 7a and 7b, the head has a convex shape. This variant is applicable to the assembly of elements that may be used by children, for example for toys. The rounded shape avoids injuries by friction and prevents unintentional dismantling.

FIG. 8 shows a device 46 for screwing a screw according to the invention having a partially spherical shape. The device 46 comprises a socket 48 comprising a female cavity comprising at least one shoulder 50 adapted to interact with at least one shoulder 20 of the screw head so as to be able to drive the screw in the screwing direction and in the unscrewing direction. The female cavity of the socket 48 has the shape of an opening comprising shoulders 50 placed in the reverse direction from that of the screw head and adapted to drive the screw head in the screwing direction by interaction of the bearing surfaces and of the convex portions of the tool and of the head.

When the tool is brought in the direction for unscrewing the head, the convex portion of the tool comes to bear tangentially on the convex portion 24 of the head. The convex portion 24 acts as a cam and the head is driven in the unscrewing direction.

FIG. 11 illustrates another type of screwing and unscrewing device 52 for a bolting part according to the invention. More particularly, it illustrates a combination box-end and open-end wrench which has, at a first end 54, a symmetrical female cavity, according to a symmetry that is orthogonal relative to a plane, with the shape of the head of the bolting part according to the invention.

At the second end, the wrench has an open end 56 comprising at least one shoulder oriented in the opposite direction from that of the head of the bolting part.

This type of device operates in the same way as that described and illustrated in FIG. 8 for screwing and unscrewing the bolting part.

Other screwing and unscrewing devices can be used to screw or unscrew a head of a bolting part according to the invention.

For example, they could be offset wrenches, socket wrenches, deep opening tubular socket wrenches, combination open-end and box wrenches, screwdriver endpieces, or ratchet screwdriver endpieces.

FIGS. 12 and 13 illustrate a variant embodiment of a tool or device making it possible to screw and unscrew a bolting part according to the invention. The tool makes it possible to apply a compression force and a torque making it possible to rotate the screw.

Accordingly, the tool comprises a longitudinal arm 58 that is substantially cylindrical and mounted so as to rotate freely in a tubular sleeve 60. The sleeve 60 and the arm 58 are placed coaxially. The arm 58 comprises a first end 62 and a second end 64 extending beyond the sleeve.

Fitted to the first end 62 is a socket 64. The socket 64 is fitted removably on the end of the arm and can therefore be removed from the arm. The user can therefore choose the socket 64 that suits the various shapes of nut or of screw according to the invention. Accordingly a set of sockets is provided having different cavities 66 and suitable for being fitted onto the first end of the arm 58.

The tool also comprises a brass ring 68 that is coaxial and placed on the side of the first end 62 of the arm. The ring 68 acts as an abutment for the socket 64 when the latter is moved in translation in an unscrewing direction.

An elastic means 70, forming a compression spring, is placed adjacent to the abutment 68 and absorbs the translational movement of the socket 64, transmitted by means of the ring 68, when unscrewing.

The tool operates in the following manner. When the user wishes to screw a nut or a screw according to the invention, he chooses the socket 64 suited to the determined screw or nut, and engages the socket 64 on the first end 62 of the arm 58 of the tool. The user manually or with the aid of a press, which can be seen in FIG. 13, applies a force so as to move the tool in axial translation in a first direction toward the screw or the nut. When the screw or the nut is engaged in the socket, the user exerts on the arm a torque with a force tending to turn the arm 58 in a first direction of rotation corresponding to screwing, while maintaining the axial force. The torque is transmitted to the socket 64 via the connection secured between the first end 62 of the arm and the socket 64.

When the user wishes to unscrew the screw or the nut, he still exerts an axial force so as to keep the nut or the screw engaged in the socket 64. He then exerts on the arm a torque with a force tending to unscrew the screw or the nut. The screw or the nut then tends to move in translation in a second direction, the reverse of the first direction, and exerts an axial pressure on the tool. This pressure is transmitted to the elastic means 70 by means of the socket and of the ring 68 forming an abutment. Thus the pressure exerted on the screw does not prevent unscrewing and consequently its translational movement in the second direction.

FIG. 9 illustrates another embodiment of a bolting part manufactured using the method according to the invention. In this embodiment, the head comprises a hollow female cavity comprising three shoulders. This embodiment has the same features and the same advantages as those described above. The associated tool then has a socket having shoulders oriented outward and adapted to interact with the female cavity of the head of the bolting part.

The invention is in no way limited to the embodiments described and illustrated that are given only as examples. Notably the invention can be applied to a bolting part such as a nut.

The invention claimed is:

1. A method for manufacturing a bolting part in which the bolting part has a head extending longitudinally between one end and another end, the head having a section in a plane perpendicular to a longitudinal axis of the bolting part, the head having a substantially circular shape, the head having at least one shoulder extending in a radial plane at a periphery thereof and at least a pair of convex portions, the shoulder defining a planar surface between the pair of convex surfaces, the method for manufacturing comprising:
    shearing a metal wire so as to form said metal wire of a desired length;
    forming the sheared metal wire so as to have a first end face parallel to a second end face, said first and second end faces being perpendicular to the longitudinal axis;
    rough machining the formed metal wire so as to form a head at said first end face, said head having a thickness and a flat planar surface extending transverse to the longitudinal axis; and
    finishing the rough machined metal wire by a punch so as to form the head having the at least one shoulder and the pair of convex portions, the steps of forming, rough machining and finishing carried out exclusively by cold heading, said at least one shoulder and said pair of convex portions having a length approximately equal to said thickness of said head.

2. The method of manufacturing of claim 1, the step of forming comprising placing the sheared metal wire in a first die, the step of rough machining comprising placing the formed metal wire in a second die, the step of finishing comprising placing the rough machined metal wire in a third die.

3. The method of manufacturing of claim 2, the step of forming comprising applying a first punch to said first die so as to cold head the first and second end faces, the step of rough machining comprising applying a second punch to said second die so as to cold head the head, the step of finishing comprising applying a third punch to said third die so as to cold head the shoulder on the head.

4. The method of manufacturing of claim 3, further comprising:
    forming a cavity in said second punch, the step of applying the second punch comprising forming the head of a conical shape.

5. The method of manufacturing of claim 4, the step of applying the second punch comprising forming the head so as to have a periphery of a convex shape.

6. The method of manufacturing of claim 5, the step of applying the second punch comprising forming the convex shape of the head in which an angle between the periphery of the head and the longitudinal axis is between 0° and 45°.

7. The method of manufacturing of claim 3, the step of applying the third punch comprising:
    forming a plurality of the shoulders on the head such that the plurality of shoulders extend in radial planes, said plurality of shoulders being evenly circumferentially spaced from each other.

8. The method of manufacturing of claim 2, said first die and said second die and said third die arranged sequentially one after the other.

* * * * *